United States Patent [19]

Kuipers

[11] 4,358,496
[45] Nov. 9, 1982

[54] POULTRY MANURE PANEL AND METHOD OF MAKING SAME

[75] Inventor: John H. Kuipers, Holland, Mich.

[73] Assignee: Agri Environment Systems, Inc., Hudsonville, Mich.

[21] Appl. No.: 213,336

[22] Filed: Dec. 5, 1980

[51] Int. Cl.³ .......................... B32B 3/28; B32B 5/22; B32B 5/26

[52] U.S. Cl. ..................................... 428/72; 156/62.2; 156/307.1; 427/372.2; 427/422; 428/182; 428/285; 428/286

[58] Field of Search ...................... 119/1, 95; 428/182, 428/184, 186, 72, 35, 283, 285–287; 427/421, 422, 372.2

[56] References Cited

U.S. PATENT DOCUMENTS

| | | | |
|---|---|---|---|
| 3,109,763 | 11/1963 | Finger | 156/276 |
| 3,198,686 | 8/1965 | Caligari | 161/6 |
| 3,450,593 | 6/1969 | Fossier et al. | 156/293 |
| 3,554,417 | 12/1970 | Corzine . | |
| 3,819,466 | 6/1974 | Winfield et al. | 428/182 |
| 4,044,188 | 8/1977 | Segal | 428/283 |

Primary Examiner—Paul J. Thibodeau
Attorney, Agent, or Firm—Varnum, Riddering, Wierengo & Christenson

[57] ABSTRACT

A poultry panel (20) for collecting manure comprising fiberglass reinforced layers (22, 30) with a preformed corrugated board (24) therebetween. The fiberglass reinforced layers (22, 30) consist of a resin-catalyst mixture (22, 30) containing calcium carbonate as a filler. The corrugated board (24) consists of two layers - one flat (26) and one corrugated (28). The poultry panel (20) provides a hard, rigid material which is easy to handle, inexpensive to manufacture, and resistant to corrosion. The poultry panel (20) is formed by spraying and laying successive layers of the resin-catalyst mixture and fiberglass sheets onto a metal form (44) with the preformed corrugated board (24) embedded between two such layers. The resulting composite is rolled to eliminate air bubble formation, cured until dry, removed from the metal form (44), and cured until hard.

8 Claims, 2 Drawing Figures

POULTRY MANURE PANEL AND METHOD OF MAKING SAME

TECHNICAL FIELD

This invention relates to a poultry panel used for collecting manure and the method of making the same. In one of its aspects, this invention relates to a poultry panel having surfaces of improved corrosion resistance.

BACKGROUND ART

Generally, metal chicken manure panels, set under chicken screening where chickens sit, are used to collect manure. Although these metal panels are frequently cleaned, the poultry manure is very corrosive, causing failure to the metal panels within a few years. The metal panels are very unpleasant and expensive to replace.

It has been suggested to replace metal panels with fiberglass reinvorced resin panels which are more corrosion resistant. However, such panels are too flexible in the ten-foot length sections required in the chicken houses or, if made rigid enough through the use of increased thickness fiberglass, are too expensive and heavy to be competitive.

Technology for forming resin and fiberglass panels is well known as shown in U.S. Pat. No. 3,198,686 issued to Eugene Caligari, Jr., on Aug. 3, 1965; U.S. Pat. No. 3,197,352 issued to James M. Coates on July 27, 1965, and U.S. Pat. No. 3,109,763 issued to Finger on Nov. 5, 1963.

It has also been suggested to sandwich rigid fillers between fiberglass reinforced panels for strength and lightness. For example, see U.S. patents to Fossier et al U.S. Pat. Nos. 3,450,593, issued June 17, 1969, to Coates 3,197,352 issued July 27, 1965, and to Adams 3,867,244 issued Feb. 18, 1975.

DISCLOSURE OF INVENTION

According to the invention, an improved poultry panel is formed of fiberglass reinforced synthetic resin, the panel having the strength and rigidity required for ten-foot long sections and yet being inexpensive and corrosion resistant by embedding into the panel during the forming process a flexible lamina consisting of a corrugated sheet and a flat sheet. Further, it has been found that the cost of the panel can be reduced significantly without affecting the durability and strength of the product by incorporating up to about 35% calcium carbonate into the resin and catalyst mixture.

The panel according to the invention is formed in a process wherein successive layers of fiberglass batting and liquid thermosetting resin and catalyst mixture are deposited on a preform and subsequently cured to a solid, hard panel. According to the invention, a flexible, preformed, corrugated panel consisting of a flat sheet of paperboard and a corrugated sheet of paperboard is deposited between such successive layers of fiberglass, batting and liquid thermosetting resin during the lay-up process.

The invention achieves a rigid and inexpensive panel in a surprising manner. The corrugated core is light and flexible, yet, when incorporated into the board, adds substantial rigidity without any significant addition of weight to the product.

The panel is formed on a metal form by spraying and laying successive layers of resin-catalyst mixture and fiberglass sheets embedding a preformed corrugated board. The resulting composite is rolled to eliminate air bubbles formed, cured until dry, removed from the metal form and cured until hard.

BRIEF DESCRIPTION OF DRAWINGS

The invention will now be described with reference to the drawings in which.

BEST MODE FOR CARRYING OUT THE INVENTION

Figure 1:
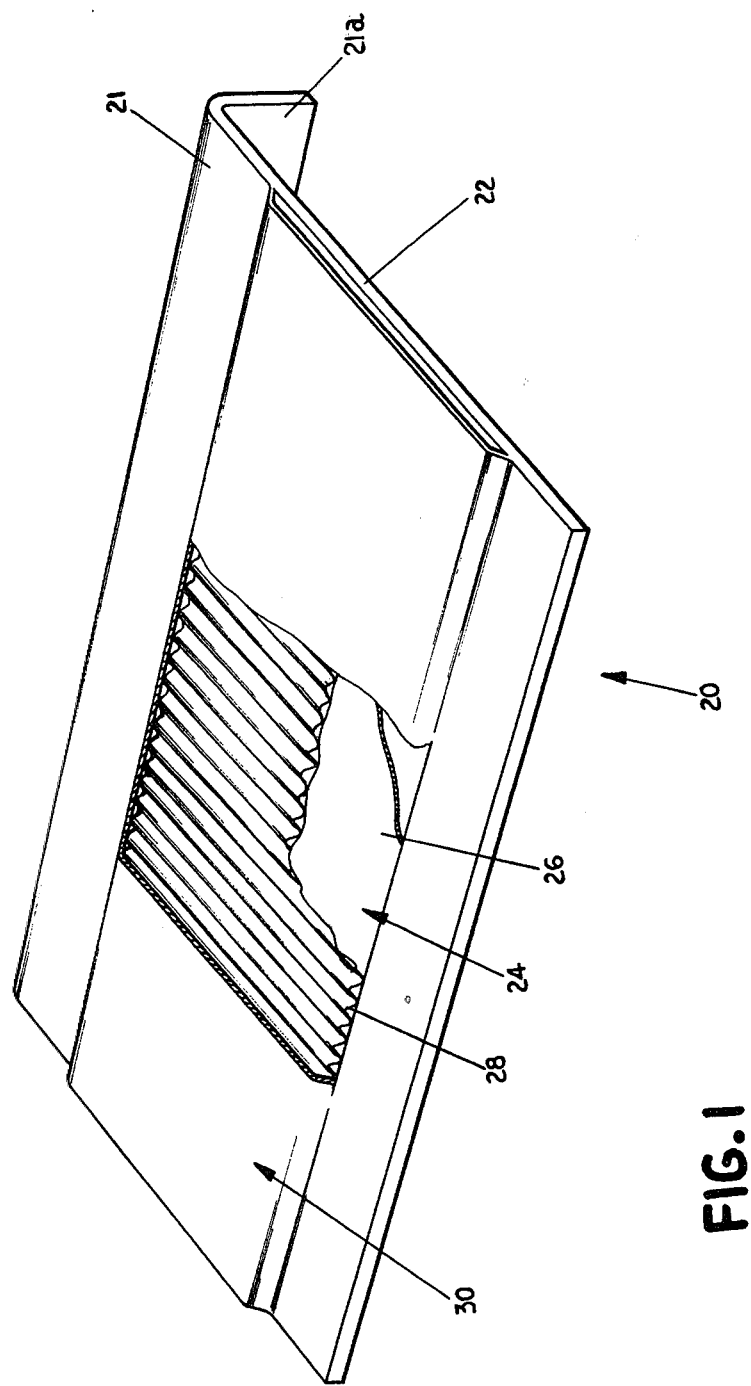
FIG. 1 is a perspective view of a section of a panel according to the invention.

Referring now to the drawings and to FIG. 1 in particular, there is shown a poultry panel 20 formed in generally a L-shape with a broad base portion 21 and an upstanding edge 21a. In FIG. 1, portions of the panel have been broken away to show the different laminae. The first lamina comprises a layer 22 of fiberglass, reinforced resin made in a conventional lay-up procedure which will be described hereinafter. The second lamina 24 consists of a layer 26 of a flat sheet of paperboard secured in conventional fashion to a corrugated layer 28. The corrugations of the corrugated layer 28 are aligned transverse to the longitudinal length of the panel. The top layer 30 is like the bottom layer 22 and comprises fiberglass reinforced thermosetting resin.

The resin, according to the invention, can be any conventional thermosetting resin which, when mixed with a catalyst, cures to a hard, corrosion-resistant surface. Preferably, the resin is mixed with a catalyst in a conventional manner and also includes up to about 35% calcium carbonate, also known as marble dust. Further, the resin and catalyst are mixed with a solvent, such as methyl ethyl ketone and heated prior to spraying to provide sufficient viscosity for the spraying operation.

When the composite panel is removed from the metal form 44, the surface which was in contact with the metal form is smooth and slick, permitting easy cleaning by periodically running water over the surface thereof.

The panel formed according to the invention is rigid and of sufficient strength in ten-foot sections to enable the panel to replace the conventional metal panels. The panels, according to the invention, are extremely corrosion resistant to the corrosive chicken manure, yet can be manufactured at a cost which is quite competitive with the conventional metal panel. The incorporation of the two-layer corrugated lamina into the panel surprisingly strengthens the panel sufficiently to make it rigid. Yet, the panel is relatively light and the amount of expensive resin can be minimized. It is to be noted that the spaces between the flat and corrugated sheets are free of resin, thereby making the panel relatively light in weight. The exposed side of the corrugated sheet is of course filled with resin and it is believed that the filing of these corrugations results in significant strengthening of the panel.

Figure 2:
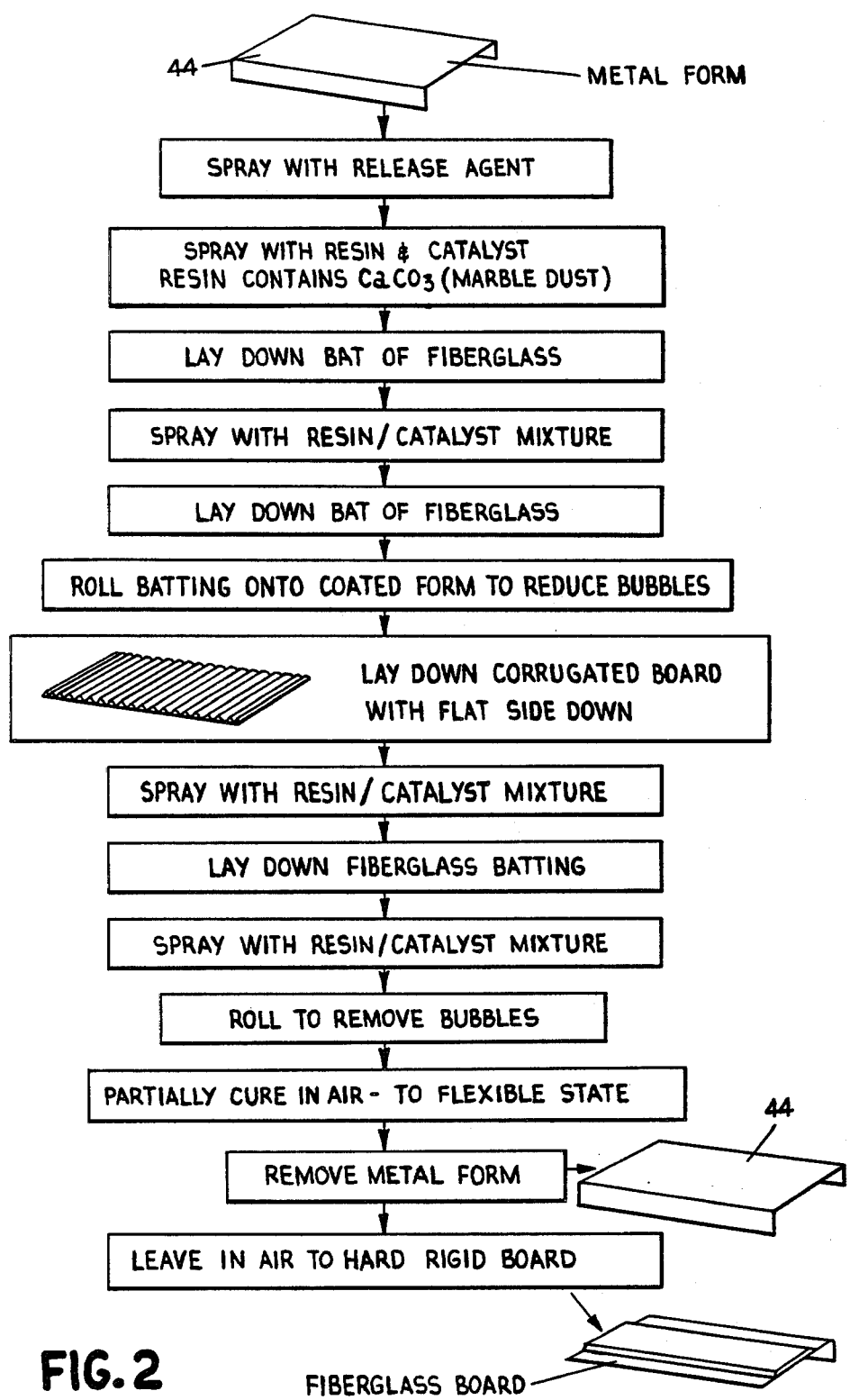
FIG. 2 is a flow chart outlining the method of constructing a panel according to the invention.

The process of fabricating the panel 20 is outlined in the flow chart of FIG. 2. The first step is spraying a metal form 44 with a release agent. The release agent used can be any conventional mold release agent such as an FU7L external mold release agent sold by Axle Plastic Laboratories, Inc. Step 2 is spraying the form 44 with the resin-catalyst mixture. This mixture is prepared by blending 30–35% calcium carbonate, a thermosetting resin and a small amount of methyl ethyl ketone used as a catalyst. This mixture is then heated to reduce the mixture viscosity so as to permit spraying.

Step 3 consists of laying a bat of fiberglass down onto the first resin-catalyst mixture. This bat is then sprayed with the resin-catalyst mixture in step 4. In step 5 a second bat of fiberglass is laid on the surface of the form. At this point the batting is then rolled on the coated form to eliminate any air bubbles formed in the process thus far (step 6).

Step 7 consists of spraying of the second bat of fiberglass with the resin-catalyst mixture, followed by (step 8) the laying of the preformed corrugated board 24, the flat layer 26 being placed onto the fiberglass reinforced resin layer 22. The corrugated layer 28 of the corrugated board 24 is sprayed with the resin-catalyst mixture in step 9, and a third bat of fiberglass is placed onto the sprayed corrugated board 24 in step 10. Finally, in step 11, the last layer of resin-catalyst mixture is sprayed onto the coated form.

In step 12, the coated form is, again, rolled to eliminate air bubbles. The coated form is then partially cured in the air until it is dry and fairly flexible (step 13). The coated form is trimmed at the edges to shape and remove excess resin in step 14. The metal form 44 is removed in step 15. Lastly, in step 16 the composite resulting is cured in air until it is hard and rigid.

The resin used according to the invention is any resin which is conventionally used in fiberglass reinforced resin shapes. Examples of such resins are polyester resins, such as phenol formaldehyde resin, orphthalic resins. A specific example of an orphthalic resin is 8AA9T-15 sold by Ashland Chemical Co. The resins are typically mixed with a catalyst, in an amount of about 2% by weight, and a solvent such as methyl ethyl keytone.

While a particular embodiment of the invention has been shown, it will be understood that the invention is not limited thereto since modifications may be made by those skilled in the art, particularly in light of the foregoing teachings. It is, therefore, contemplated by the appended claims to cover any such modifications as to incorporate those features which constitute the essential features of these improvements within the true spirit and the scope of the invention.

The embodiments of the invention in which an exclusive property or privilege is claimed are defined as follows:

1. An elongated panel for collecting poultry manure, the panel comprising:
   a plurality of integrally joined laminae, each formed by laying down in succession a fiberglass batting and a layer of a thermosetting resin, catalyst and solvent mixture, said laminae being subsequently cured to a hard, rigid mass; and
   a flexible, preformed corrugated board consisting of a flat sheet of paperboard and a corrugated sheet of paperboard embedded in and between two of said laminae.

2. An elongated panel in accordance with claim 1 wherein the resin, catalyst and solvent mixture includes 30–35% calcium carbonate, a thermosetting resin and methyl ethyl ketone.

3. An elongated panel according to claim 1 wherein spaces between the flat and corrugated sheets are substantially free of the resin, catalyst and solvent mixture.

4. An elongated panel according to claim 1 or 3 wherein the corrugations extend transverse to the greatest dimension of the panel.

5. In a process of forming a fiberglass reinforced synthetic resin panel by depositing successive layers of fiberglass batting and thermosetting resin, catalyst and solvent mixture onto a preform, and subsequently curing the mixture to a rigid, hard panel, the improvement which comprises:
   depositing a flexible preformed corrugated lamina consisting of a flat sheet of paperboard and a corrugated sheet of paperboard between two such successive layers of fiberglass batting and a liquid thermosetting resin, catalyst and solvent mixture prior to said curing step so as to embed the preformed corrugated lamina in said layers.

6. A process in accordance with claim 5 therein said resin, catalyst and solvent mixture comprises 30–35% calcium carbonate (CaCO3), a conventional thermosetting resin, and a solvent.

7. A process in accordance with claim 6 wherein the calcium carbonate, resin, catalyst and solvent mixture is blended and then heated to reduce said mixture viscosity of said mixture and sprayed onto said preform.

8. An elongated panel according to claim 1 wherein said corrugated board is bonded to the laminae by said resin, catalyst and solvent mixture.

* * * * *